United States Patent [19]

Yu

[11] 4,251,871
[45] Feb. 17, 1981

[54] METHOD AND APPARATUS FOR STORING AND RECONSTRUCTING CHINESE-LIKE CHARACTERS

[75] Inventor: Wellington C. Yu, San Jose, Calif.

[73] Assignee: International Business Machines Corporation, Armonk, N.Y.

[21] Appl. No.: 947,079

[22] Filed: Sep. 29, 1978

[51] Int. Cl.³ .......................... G06F 3/153; B41J 3/50
[52] U.S. Cl. .................................. 364/518; 400/110; 178/30
[58] Field of Search ............... 364/518, 519, 521–523, 364/900; 340/724, 744, 747, 751, 790, 798, 802, 803, 146.3 AE, 146.3 MA, 146.3 Z, 146.3 A, 146.3 J; 178/15, 25, 30; 400/110, 141, 484

[56] References Cited

U.S. PATENT DOCUMENTS

| | | | |
|---|---|---|---|
| 3,665,450 | 5/1972 | Leban | 340/751 |
| 3,809,203 | 5/1974 | Ogawa et al. | 400/141 |
| 3,809,204 | 5/1974 | Ogawa | 400/110 |
| 3,820,644 | 6/1974 | Yeh | 400/110 |
| 3,852,720 | 12/1974 | Park | 340/146.3 Z |
| 3,950,734 | 4/1976 | Li | 400/110 |
| 3,987,412 | 10/1976 | Morrin, II | 340/146.3 AE |
| 3,999,167 | 12/1976 | Ito et al. | 364/900 |
| 4,096,934 | 6/1978 | Kirmser et al. | 400/110 |
| 4,144,405 | 3/1979 | Wakamatsu | 340/751 |

OTHER PUBLICATIONS

Computer Graphics and Image Processing–Recognition of Printed Chinese Characters by Automatic Pattern Analysis by W. Stallings, vol. 1, No. 1, Apr. 1972, pp. 47–63.

*Primary Examiner*—Charles E. Atkinson
*Assistant Examiner*—Gary Chin
*Attorney, Agent, or Firm*—R. Bruce Brodie

[57] ABSTRACT

In a method and apparatus for reconstructing Chinese characters such as in a printer system, each of the characters is divided into a pair of components at least one of which occurs in one or more other characters. The components which have a height equal to the height of a standard character cell are stored together with information as to the locations of the components across the width of the standard character cell for each character. The components may be stored in a compressed form, in which event the information as to their location forms a part of the compressed data. When a given character is to be reconstructed, the first component thereof is transferred to a buffer where it is temporarily stored at the proper location across the width of a standard character cell. Thereafter, the second component is transferred to a logic circuit together with the temporarily stored first component, and the two are logically OR'ed to form the complete character. The complete character may then be advanced to imaging apparatus of a printer or other utilizing means.

4 Claims, 14 Drawing Figures

| | | | | | | |
|---|---|---|---|---|---|---|
| CHARACTERS: | 他 | 吔 | 她 | 池 | 地 | |
| A COMPONENT: | 也 | 也 | 也 | 也 | 也 | FIG. 1A |
| B COMPONENT: | 亻 | 口 | 女 | 氵 | 土 | |

| | | | | | | |
|---|---|---|---|---|---|---|
| CHARACTERS: | 問 | 閂 | 閃 | 開 | 関 | |
| A COMPONENT: | 門 | 門 | 門 | 門 | 門 | FIG. 1B |
| B COMPONENT: | 口 | 一 | 人 | 开 | 关 | |

| | | | | |
|---|---|---|---|---|
| CHARACTERS: | 己 | 已 | 巳 | |
| A COMPONENT: | 己 | 己 | 己 | FIG. 1C |
| B COMPONENT: | NONE | ' | ' | |

| | | | | | |
|---|---|---|---|---|---|
| CHARACTERS: | 府 | 麼 | 应 | 序 | |
| A COMPONENT: | 广 | 广 | 广 | 广 | FIG. 1D |
| B COMPONENT: | 付 | 麼 | 业 | 予 | |

| | | | | | | |
|---|---|---|---|---|---|---|
| CHARACTERS: | 銜 | 衍 | 街 | 術 | 衛 | |
| A COMPONENT: | 行 | 行 | 行 | 行 | 行 | FIG. 1E |
| B COMPONENT: | 金 | 氵 | 圭 | 术 | 韋 | |

COMPLETED CHARACTER (A+B)

DATA TO PRINT HEAD

FIG. 6B

TO PATTERN SHIFTER 58

FIG. 7

METHOD AND APPARATUS FOR STORING AND RECONSTRUCTING CHINESE-LIKE CHARACTERS

TECHNICAL FIELD

The present invention relates to arrangements for storing sets of characters and like information for reconstruction by a related system, and more particularly to printers in which sets of characters are stored in a raster format for use by the printer in response to incoming signals identifying characters to be printed.

BACKGROUND ART

It is well known to provide one or more sets of characters in a printer arrangement in which incoming signals identify characters to be printed. The character sets perform a translation function by providing to the printer the appropriate raster patterns or other modulation bits in response to incoming commands to print particular characters so that the actual imaging apparatus of the printer can effect the physical printing of the characters.

A difficulty which commonly plagues printer systems is that of storage capacity for the character sets. Depending upon printer resolution and other factors a large number of bits may have to be stored for each character. If the additional requirement for storing several different sets of characters is imposed, an even greater storage burden is placed upon the system. Moreover, certain types of characters such as Chinese characters are relatively complex and typically require relatively large storage capacities, particularly if enough data is to be stored to provide for printed characters of high resolution.

Various techniques have been employed in an attempt to reduce the storage capacity required in various printer systems. A common technique is to compress the bit stream for purposes of storage of the characters with the compressed data being thereafter decompressed prior to use. An example of compression is provided by U.S. Pat. No. 3,987,412 of Thomas Harvey Morrin, entitled Method and Apparatus for Image Data Compression Utilizing Boundary Following of the Exterior and Interior Borders of Objects, issued Oct. 19, 1976 and commonly assigned with the present application. The arrangement shown in the Morrin patent provides compression by virtue of the format the data is presented in for purposes of printing. Morrin discloses a border-following scheme in which as each dot of a character is printed the printer then vectors directly to the nearest dot which is the next to be printed.

Arrangements such as that described in the Morrin patent are generally useful in reducing the required storage space in printers having various different types of characters and character sets. Over and above those considerations, it is desirable to further save on storage space where complex characters are used. This is particularly true, for example, in the case of Chinese characters and like oriental characters which tend to be relatively complex in terms of the bit patterns that must be stored to print them. The problem is particularly severe where high resolution requirements are imposed.

One example of an arrangement for reducing the storage capacity required by oriental characters is described in a publication by Shen et al, "Interactive Ideographic System", IBM Technical Disclosure Bulletin, Vol. 17, pp. 2024-2027, December 1974. Another example is provided by Hasegawa in Japanese Patent Application publication No. 49/129947 and is entitled "Character Generating System". Hasegawa describes a system for composing characters by combining certain elementary symbols in different relative positions and in different proportions. While such arrangement provides certain advantages, it has been found that problems frequently arise in determining the exact positions of the stored symbols and the proportional sizes thereof during the printing process. Similar comments apply to the arrangement described in the publication to Shen et al. Further examples are provided by U.S. Pat. No. 3,852,720 of Park, "Method and Apparatus For Automatically Generating Korean Character Fonts", issued Dec. 3, 1974, and U.S. Pat. No. 3,999,167 of Ito et al, "Method And Apparatus For Generating Character Patterns", issued Dec. 21, 1976.

While arrangements of the prior art have recognized that storage capacity can be reduced in the case of Chinese or like oriental characters by dividing the characters into components for purposes of storage with the components later being combined during the printing process, they have created various other problems, particularly in the manner in which the character components must be recombined if reasonable resolution is to be achieved.

DISCLOSURE OF INVENTION

Methods and apparatus in accordance with the invention divide Chinese or similar characters into several component parts, at least one of which is found in other characters. This enables many characters to be printed by storing a relatively small number of components. The components are made equal in size in at least one dimension such as height so that the information stored therewith and identifying the locations of the components within the standard character cells for the various characters is relatively simple. A character can be reconstructed such as for printing simply by superimposing the components with proper spacing thereof relative to the standard character cell using a logical OR circuit.

In one example of the invention each character of the Chinese Kanji alphabet is divided into two components having heights equal to the height of the standard character cell. The components are stored as a first set of information together with a second set of information comprising indications as to the lateral spacing of the various components across the width of the standard character cell for the various different Chinese characters. A command dictating that a particular character be reconstructed results in the first component of that character being transferred together with information as to its location within the standard character cell from the memory through an OR circuit to a strip buffer where it is temporarily stored. The second component for the character together with information as to its location within the standard character cell is then transferred from the memory to the OR circuit where it is logically OR'ed with the first component which in the meantime is transferred from the strip buffer to one of the inputs of the OR circuit. This superimposes the two components within the character cell to form the completed character which is then stored in the strip buffer for use in printing the character.

There are several different ways in which the character components can be segregated and stored considering that the standard character cell comprises a matrix of raster bits. In one technique the local area of the character cell which includes the component is stored together with information as to the width of the area and the distance thereof from the lefthand vertical margin of the character cell. In this way the system can determine the distance for the lefthand margin to the start of the stored area containing the component that is to be printed. If the component is to occupy the lefthand portion of the character cell, then information as to its width combined with the distance thereof from the lefthand margin enables the location of the second or righthand component to be determined according to its distance from and to the right of the first component. In an alternative technique the lefthand area of the character cell which includes the lefthand margin as well as one of the components is stored in the memory. No information as to the size or location of the component need be stored as the system automatically locates the stored area against the lefthand margin of the character cell when printing. The second component is stored as part of an area which begins a fixed distance from the lefthand margin of the character cell and extends through the righthand portion of the cell. Thus only the fixed distance need be stored for use each time the second or righthand component of a character is being transferred for combination with the first component. In a further alternative technique each component is stored together with blank bits which define the entire remaining area of the character cell. This last approach requires considerably more storage space for the components when stored in a non-compressed form, but eliminates the need for storing any information as to the width or spacing of the components within the character cell. If the components are stored in the compressed form the required storage space is greatly minimized, and at the same time information as to the locations of the components becomes part of the compressed data stored and need not be stored separately.

BRIEF DESCRIPTION OF DRAWINGS

The invention may be better understood by referring to the best mode for carrying out the invention and its industrial applicability, taken in conjunction with the accompanying drawings, in which.

BEST MODE FOR CARRYING OUT THE INVENTION, AND INDUSTRIAL APPLICABILITY

Figure 1A:
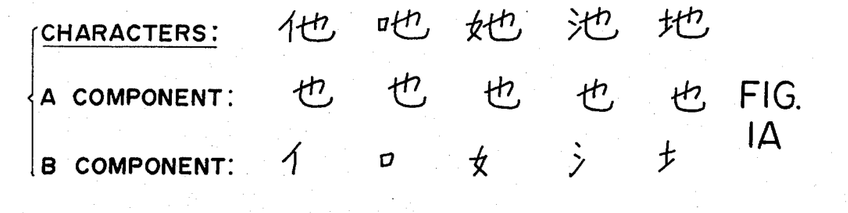
FIGS. 1A–1E are five different examples of groups of Chinese characters and the manner in which the characters of the groups are divided into components in accordance with the invention.

FIGS. 1A–E provide five different examples of groups of Chinese characters which can be stored for subsequent reconstruction by breaking into plural components, at least one of which is found in other characters. The example of FIG. 1A depicts five different characters the righthand portion of each of which comprises the same symbol. This symbol can therefore be used as the A component of each character. The other component of each character, designated the B component, is shown thereunder. While all of the A components are alike, all of the B components are different.

The present invention recognizes that certain characters such as Chinese language characters have repetitious components. By dividing each character into two or more components for purposes of data storage, it becomes possible to store a given component only once even though it may occur repeatedly in different characters so long as information with respect to the location of the component in each of the characters is available.

The data storage problems involved in a typical system can be appreciated when it is considered that about 9,000 different Chinese Kanji characters may be required to be stored. In systems where each character is contained within a standard character cell occupying a space of 32 pels (bits) by 32 pels (bits), approximately 1 megabit of storage is required. If the complete set of characters is to be available in three different sizes as is often required, then approximately 3 megabits of storage capacity is required.

Typical prior art systems have attempted to reduce the storage requirements for Chinese characters by dividing the characters into common components. The difficulty with this approach lies not only in the substantial amount of information which must be available to define the location of each component when the character is reconstructed but also in the fact that even when such positioning information is accurate the quality and resolution of the resulting character is often unsatisfactory. In some systems of this type the sizes of the stored character components must be varied during the reconstruction process, thereby creating proportionality problems.

The present invention eliminates such problems by dividing each character into a few components which are of like size in at least one dimension. The components are full size in the sense that they extend across the entire character cell in that dimension, thereby eliminating the need to alter the size or to precisely define the location of the component during reconstruction of the character. Instead it is only necessary to specify the position of the component in one direction. Specifically, each of the character components in the present example are equal in height and comprise the entire height of the character cell. Therefore, it only becomes necessary to store information defining the placement of each component along the width of the character relative to the reference or lefthand vertical edge of the character cell.

The present invention involves the observation that 5,870 characters out of a set of 9,000 Chinese Kanji characters can be stored and reconstructed using 1,610 components. The 1,610 components require about 1,460 character cells of storage area. Another 800 characters out of the set of 9,000 can share parts and can therefore be stored in about 600 character cells of storage area. Still another 1,830 characters out of the set of 9,000 can be stored and reconstructed by slicing the character horizontally so as to divide it into top and bottom components which require 960 character cells of storage area. Only about 500 characters out of the set of 9,000 must be stored as they are with each character requiring a full character cell of storage area. Therefore, instead of requiring 9,000 character cells of storage area, the alphabet of 9,000 Chinese Kanji characters requires 3,520 character cells of storage space, thereby reducing the required storage area by a factor of 2.55. As discussed hereafter the storage area requirements can be even further reduced using various compression techniques.

Figure 1B:
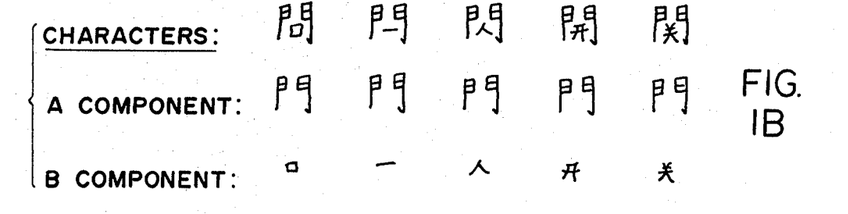

FIG. 1B provides another example of five different Chinese characters having a common component. In this example the common component is comprised of both extreme lefthand and extreme righthand portions of each character. The relatively small component in the center of each character and which differs from character to character comprises the B component.

Figure 1C:
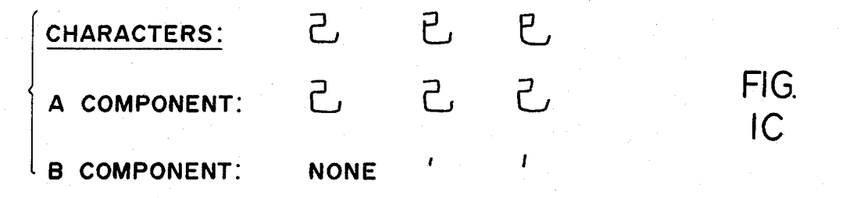

In the example of FIG. 1C three different characters are shown. These characters are quite similar except for very minor variations which comprise the B component. In this example the A component is identical to the first character so that no B component is needed to store the first character. In the case of the other two characters the B component comprises a very small addition to the A component as shown.

Figure 1D:
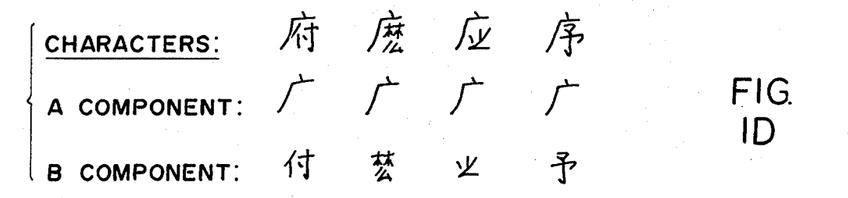

In the example of FIG. 1D the four different characters shown have a common A component consisting of the extreme lefthand and the extreme uppermost portions of each character. The remaining portions comprise the B components as shown.

Figure 1E:
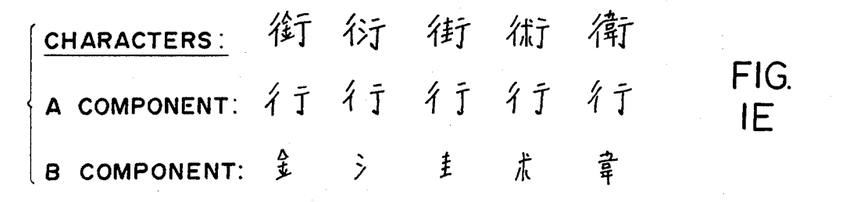

The five characters shown in the example of FIG. 1E are like those of FIG. 1B in that the common A component comprises the extreme lefthand portion and the extreme righthand portion of each character. The central portion of each character comprises the B component.

In accordance with the invention the various different groups of characters in the examples of FIGS. 1A-E are stored by storing one of the A components which are alike and each of the B components which are different. Stored together with each component is information as to the position of the component within each character in which it appears. Because in the present example the components are positioned with reference to the lefthand margin of the character cell the position information indicates the spacing of each component from the lefthand margin. This is a convenient way of referencing in a system where the reconstructed characters are printed by a raster printer which scans from left to right. In each of the examples of FIGS. 1B, 1C, 1D and 1E the A component begins at the lefthand margin of the character cell and therefore no separate information need be stored to indicate the positions of the A components within the various characters shown. Accordingly, only the B components require information as to the spacing thereof from the lefthand margin of the character cell.

Figure 2:
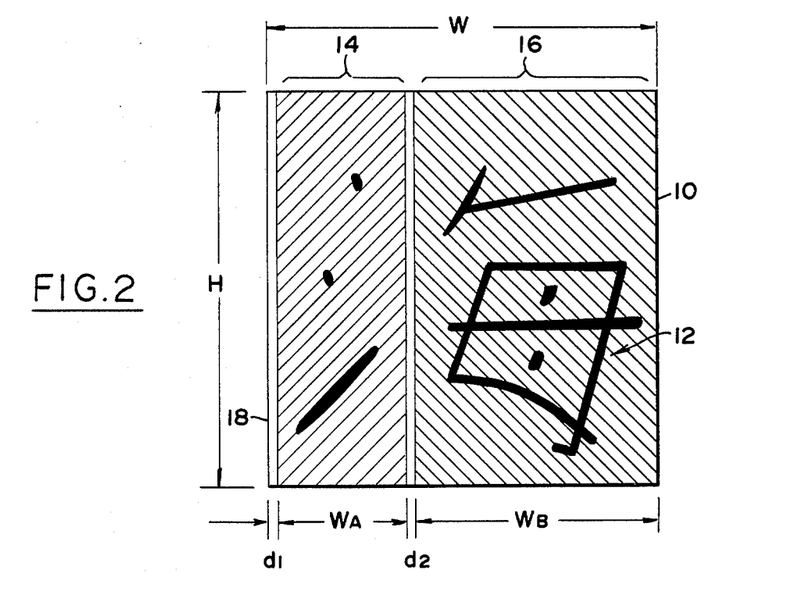
FIG. 2 is a representation of the two components of a particular character within a standard character cell indicating the manner in which the location of the components within the cell can be identified.

FIG. 2 depicts a standard character cell 10 containing a character 12 which is comprised of an A component 14 and a B component 16. For purposes of identification the A component 14 is hatched or shaded in one direction and the B component 16 is shaded or hatched in another direction. It will be seen that both the A component 14 and the B component 16 have heights equal to the height H of the character cell 10. The width of the A component 14 is designated $W_A$ and the width B component 16 is designated $W_B$. The lateral positioning of the components 14 and 16 across the width W of the character cell 10 is referenced relative to a reference or lefthand vertical margin 18 of the character cell 10. The lefthand margin 18 is conveniently chosen since raster printing typically takes place from left to right. The A component 14 beings a distance $d_1$ from the margin 18. The B component 16 begins at a location spaced to the right of the margin 18 by distances $d_1$, $W_A$ and $d_2$. Thus $d_2$ represents the spacing between the components 14 and 16.

In storing the A component 14 it is only necessary that the raster bits comprising the shaded portion shown in the lefthand portion of FIG. 2 be stored. Consequently the storage spaced required by the A component is considerably less than half the space required by a complete character cell 10. In like fashion only the shaded portion at the center and righthand portion of FIG. 2 need be stored as the B component 16. Accordingly, the storage space required by the B component in the example of FIG. 2 is more than half but still less than all of the space defined by the character cell 10. What is important is the fact that the various components of the different characters such as the A component 14 and the B component 16 repeat for various different characters, yet need only be stored once together with information representing $d_1$, $W_A$ and $d_2$ for each character in which the components appear.

Figure 3:
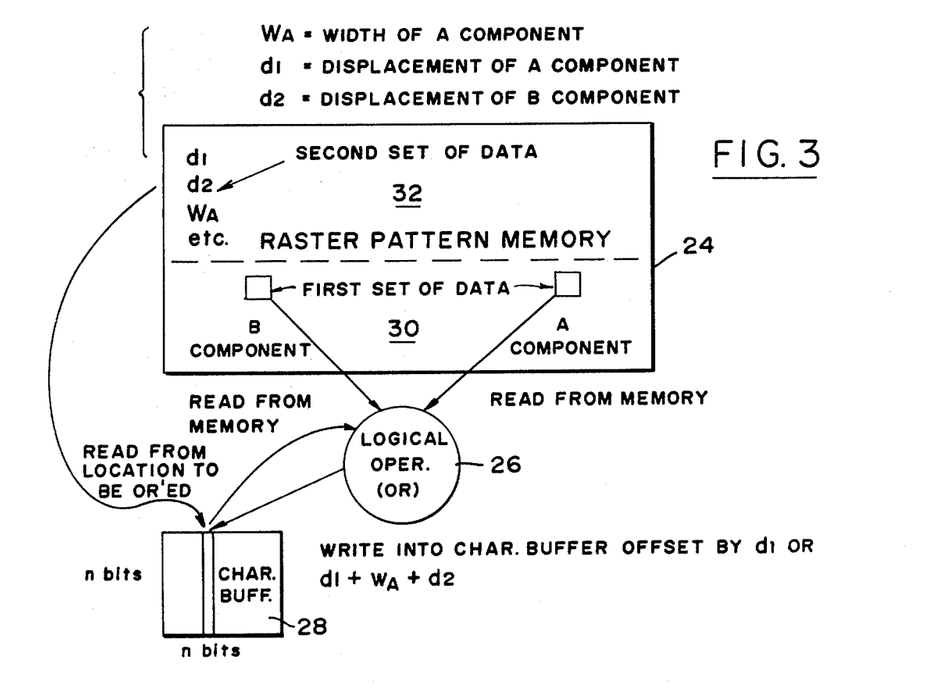
FIG. 3 is a diagrammatic illustration of the basic method in accordance with the invention.

The manner in which the various A and B components are stored and processed to reconstruct the characters is illustrated in FIG. 3. FIG. 3 depicts an arrangement which includes a raster pattern memory 24, a logical operation 26 and a character buffer measuring n bits by n bits. The raster pattern memory includes a first set of data 30 comprising the A and B components for the various Chineses characters. The memory 24 also includes a second set of data 32 comprising information representing $d_1$, $d_2$, $W_A$, and other information that may be necessary to define the locations of the various components within the cells of the various characters. The character buffer 28 comprises a storage buffer which may be the same size as the character cell 10.

When an external command is received to reconstruct a particular character, the system shown in FIG. 3 begins by transferring the A component of the character from the memory 24 through the logical operation 26 to the character buffer 28. At the same time the position information in the form of $d_1$ for the A component is transferred from the second set of data 32 to the character buffer 28 to provide for proper spacing of the A component within a character cell in the character buffer 28. The A component is temporarily stored in the character buffer 28 until the B component can be transferred from the memory 24 to the logical operation 26. At that time the A component is transferred to the logical operation 26 where it is superimposed with the B component relative to the character cell by logically OR'ing the two components together. Positioning data in the form of $d_1+W_A+d_2$ defines the position of the B component within the character cell. The various raster bits comprising the superimposed A and B components within the character cell are then temporarily stored in the character buffer 28 to await use by a printer or other character imaging device.

Thus, FIG. 3 depicts a machine implementable method for the reconstruction of Chinese-like whole characters C in a designated alphabet in which the characters C are encoded as the code equivalent of selected members of a first stored set R of the dot matrix graphical components A and B and selected members of a second stored set D of displacement, rotation, and width information comprised of $d_1$, $d_2$, $W_A$ and the like. The A and B components comprising stored set R are selected from those whole characters partitionable into two subcomponents at least one of which is common to a plurality of the whole character. Selected ones of the Chinese-like characters C may then be formed by logically combining members of the sets R and D such that:

$$C = R_1 D_1 + R_2 D_2$$

where + is a general Boolean logical operator, $R_1$ and $R_2$ (comprising the A and B components) are selected from the set R and $D_1$ and $D_2$ are selected from the set D.

Figure 4A:
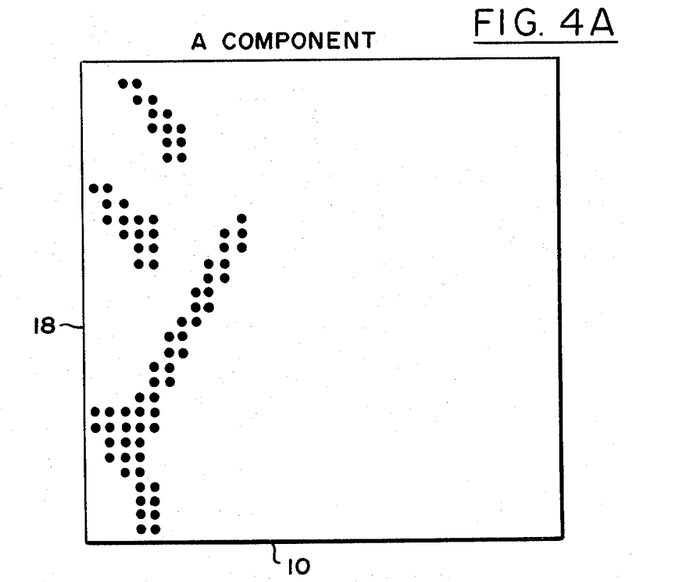
FIGS. 4A–4C illustrate in detailed fashion the manner in which two components of a particular character are combined to reconstruct the character in accordance with the invention.
Figure 4B:
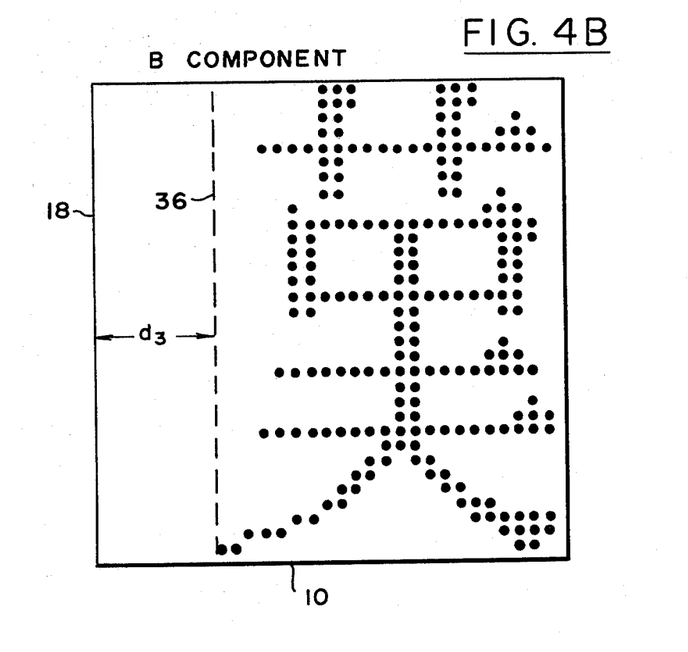
Figure 4C:
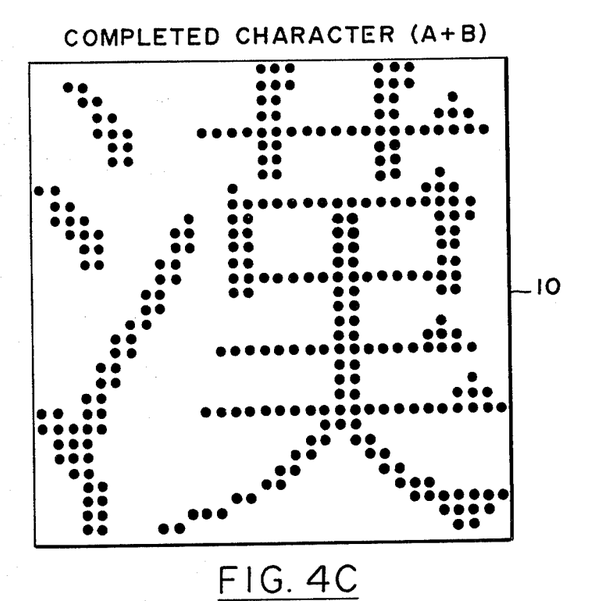

FIGS. 4A–C comprise a detailed example of a particular character and the manner in which the components are superimposed to reconstruct the character. In the example of FIGS. 4A–C the character cell 10 measures 32 pels (bits) by 32 pels (bits) with the actual printing dots being shown in the different figures thereof.

FIG. 4A depicts the A component which begins at the lefthand margin 18 and extends to the right through about a third of the width of the character cell 10. In this instance therefore the distance $d_1$ shown in FIG. 2 is zero and no positioning information need be stored in the raster pattern memory for the A component as used in this particular character. The B component is depicted in FIG. 4B. It comprises approximately the right two-thirds of the character cell 10. Whereas in the example of FIG. 2 the A and B components are separated by the distance $d_2$, in this example (FIG. 4) the B component overlaps the A component by a small amount as will be seen in FIG. 4C. Accordingly, the lefthand edge of the B component of FIG. 4B as depicted by a dashed line 36 is a distance $d_3$ from the lefthand margin 18 of the character cell 10. It is therefore necessary to store a representation of the distance $d_3$ together with the B component in the raster pattern memory. Thus, the completed character shown in FIG. 4C can be reconstructed using the arrangement shown in FIG. 3 and the stored A and B components and the value $d_3$.

Figure 5:
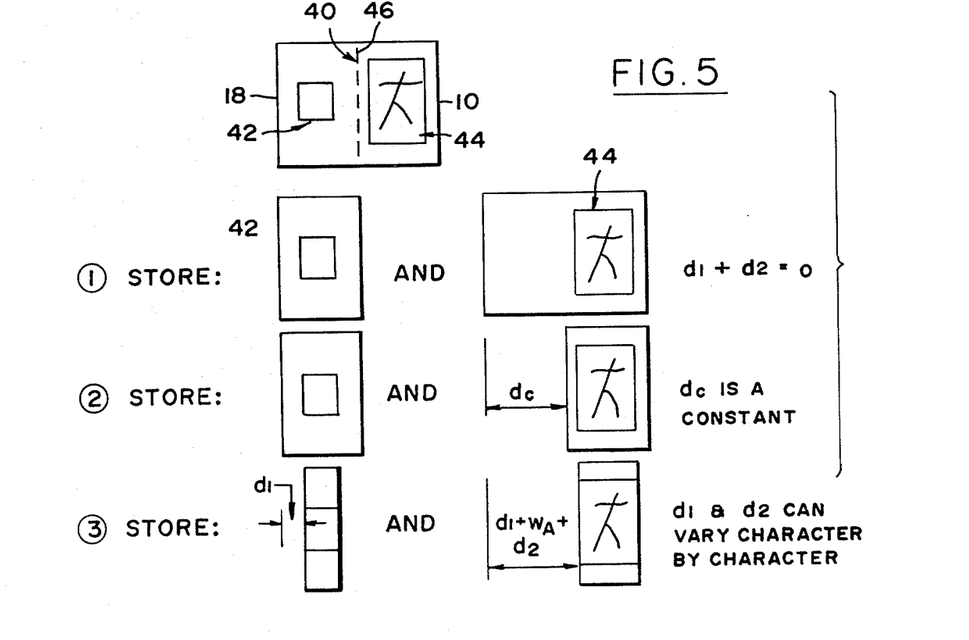
FIG. 5 illustrates a particular character in terms of three different techniques in accordance with the invention for storing and recombining the components of the character.

FIG. 5 depicts three different ways in which the character components can be stored so as to identify the locations of the components within the character cells. FIG. 5 depicts a character 40 within the character cell 10 and comprised of an A component 42 and a B component 44. A dashed line 46 extends through the character cell 10 and separates the A component 42 from the B component 44.

In a first storage technique illustrated in FIG. 5 the entire lefthand portion of the character cell 10 including the A component 42 is stored as the A component. The information which is stored as the B component comprises the remainder of the character cell 10 but with the A component 42 being blanked out. Because the A component as stored begins at the lefthand margin 18 of the character cell 10, $d_1$ is 0 and no information identifying the location of the A component need be stored. Likewise, the B component begins at the lefthand margin 18 of the character cell 10, and no information as to the location of the B component need be stored. Upon reconstruction, the logical OR operation superimposes the B component on the A component to produce the complete character 40.

In the second storage technique of FIG. 5 the stored A component is the same as in the first example. However, only that portion of the character cell 10 to the right of the dashed line 46 is stored as the B component. If a group of the characters can be conveniently divided into the two components using the same dashed line 46, then the distance of the B component from the lefthand margin 18 is a constant $d_c$. In addition to storing the A component and the B component as shown, it is only necessary to store the constant value $d_c$ and apply it each time a B component is being combined with an A component.

The third example depicted in FIG. 5 corresponds to the technique described in connection with FIGS. 2–4. The A component 42 which comprises the entire height of the character cell 10 but only the portion of the width thereof necessary to encompass the component 42 is stored together with information indicating the distance $d_1$ from the lefthand margin 18 to the beginning of the A component 42. The portion of the character cell 10 stored as the B component comprises the full height of the cell 10 but only that portion of the width necessary to encompass the B component 44. This is stored together with the width $W_A$ of the A component and the distance $d_2$ from the end of the A component to the beginning of the B component. As previously described the character is reconstructed by positioning the A component within the character cell 10 using the distance $d_1$ and thereafter positioning the B component within the character cell 10 using $d_1$, $W_A$ and $d_2$.

In the absence of any compression of the stored data, the first example shown in FIG. 5 is the most wasteful of storage space. The A component requires approximately half of a character cell of storage space, and the B component requires a complete character cell of storage space. By the same token the first example is the easiest in terms of positioning the components to reconstruct the character since it is not necessary to store of use information defining the locations of the components within the character cell. At the other extreme, the third example in FIG. 5 minimizes the storage space required for non-compressed data since only those portions of the character cell necessary to encompass the width of the components are stored. By the same token, this technique is the most difficult to implement since it requires positioning information with respect to both components, which information is different for each different character.

The techniques shown in FIG. 5 and variations thereof can be employed as dictated by storage requirements and also by the types of characters stored. Thus in the example of FIG. 1A, the A component would ideally begin a fixed distance from the lefthand margin for the characters shown with the B components beginning at the margin. Alternatively, the A component could begin a distance $d_2$ from the end of the B component. In the example of FIG. 1D the A components would begin at the lefthand margin and the B components would begin a fixed distance from the margin. In the example of FIGS. 1B, C and E the A components would fill the entire character cell with blank bits in the region of the B components as necessary. The B components could be set up to begin a fixed distance from the lefthand margin in most or all instances.

Figure 6A:
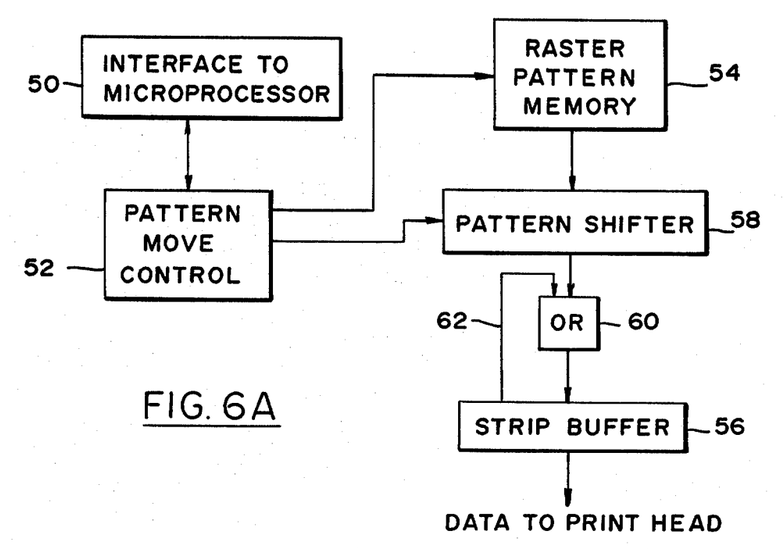
FIG. 6A is a block diagram of a preferred circuit in accordance with the invention.

FIG. 6A is a block diagram of an arrangement which may be used to carry out the invention. The apparatus shown in FIG. 6A is essentially the same as and operates in essentially the same manner as apparatus shown and described in a co-pending application of James Garman Belleson et al, Ser. No. 811,911, now abandoned, entitled "Raster Printer", filed June 30, 1977 and commonly assigned with the present application. The Belleson et al application describes a printer in which data representing characters to be printed and generated by a data processing unit is communicated over a main channel to the printer where it enters through a system adapter and passes through external registers to a microprocessor for storage. The microprocessor executes microroutines in response to programs entered by the user via an auxiliary storage disk to convert the EBCDIC codes of the character-identifing data into pattern addresses and to generate control parameters for the printing operation. The pattern addresses locate character patterns previously provided by the microprocessor and stored in a raster pattern memory. The addressed character patterns within the raster pattern memory are advanced through a pattern shifter and a strip buffer under the control of a pattern move control which responds to control signals from the microprocessor via an interface. The pattern shifter is necessary in order to expand the 32 bit long scan lines at the input side thereof into 64 bit long scan lines at the output thereof in preparation for entry into the strip buffer which processes a pair of 32 bit words at a time. The scan lines as assembled by the strip buffer are then converted from parallel into serial format and are advanced to the print head of the imaging apparatus of the printer system.

The operation of the arrangement shown in FIG. 6A is similar to that of the Belleson et al arrangement and includes a microprocessor interface 50 for coupling a pattern move control 52 to a microprocessor (not shown). The microprocessor provides control signals via the interface 50 to the control 52 as well as character patterns to a raster pattern memory 54. In the present example the raster pattern memory 54 does not store the full characters as such but instead stores the components of the characters together with information as to the location of the components within the character cell of each character. At the same time the microprocessor provides the pattern move control 52 with the information necessary to select the two components of each character identified by a pattern address from the microprocessor and to properly locate the components within a character cell. The selected components are transferred to a strip buffer 56 via a pattern shifter 58 which operates in the same manner as in the Belleson et al arrangement so as to shift 32 bit scan lines at the input thereof to selected positions within 64 bit scan lines at the output thereof. The output of the pattern shifter 58 is coupled through an OR gate 60 to the strip buffer 56.

In operation the pattern move control 52 responds to a pattern address by identifying the two components and the location information therefor for the character to be reconstructed. The A component is advanced under the control of the pattern move control 52 from the memory 54 through the pattern shifter 58 and the OR gate 60 to the strip buffer 56 where the A component is temporarily stored. Subsequently the B component in the memory 54 is advanced through the pattern shifter 58 to the OR gate 60 where it is OR'ed with the A component fed to the OR gate 60 from the strip buffer 56 via a lead 62. The resulting character is stored in the strip buffer 56. The various scan lines within the strip buffer 56 are then converted from a parallel to a serial format and are applied to the print head within the imaging apparatus of the printer in the same manner as described in the Belleson et al application. Depending upon the size of the strip buffer 56 and the timing of operation of the system the two components of each character may be OR'ed and the results thereof stored in the strip buffer 56 prior to the temporary storage of the A component of the next character in the strip buffer and the OR'ing thereof with the B component of the character, as just described. Alternatively, the A components of a plurality of characters may be successively transferred and stored in the strip buffer 56, following which each A component is then OR'ed with the corresponding B component, and the resulting character stored in the strip buffer 56.

Figure 6B:
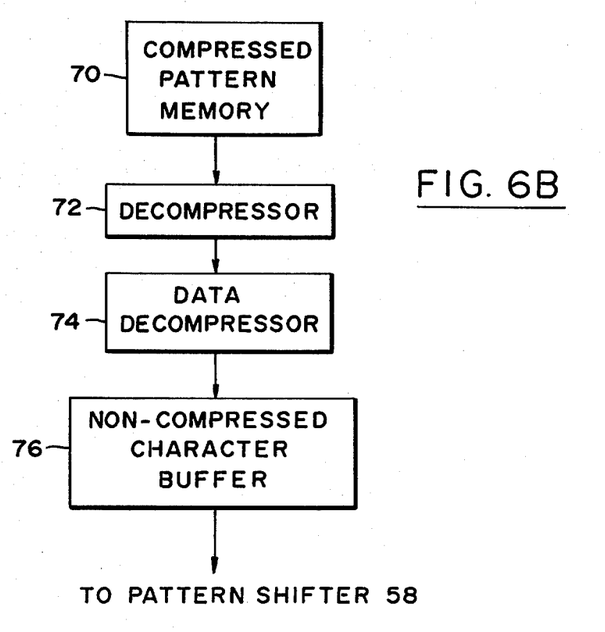
FIG. 6B is a block diagram of an alternative memory arrangement for use with the circuit of FIG. 6A.

As previously noted arrangements in accordance with the invention can effect a savings in required storage space by a factor of as much as 2.55 when compared with arrangements where each complete character is stored. The storage requirements of systems according to the invention can be even further reduced by employing any one of a number of conventional compression techniques in conjunction with the invention as illustrated in FIG. 6B. The arrangement of FIG. 6B which replaces the raster pattern memory 54 of FIG. 6A includes a compressed pattern memory 70, a decompressor 72, a data decompressor 74 and non-compressed character buffer 76. The compressed pattern memory 70 is similar to the raster pattern memory 54 except that it stores the character components in a compressed form. Each component is advanced to the pattern shifter 58 by first being decompressed in a decompressor 72 and a data decompressor 74 and then temporarily stored in the non-compressed character buffer 76.

An example of a compression-decompression technique which can be used in the arrangement of FIG. 6B is described in the previously referred to U.S. Pat. No. 3,987,412 of Morrin. As previously noted Morrin discloses a border-following scheme in which as each dot of a character is printed the printer then vectors to the nearest dot which is the next to be printed. Consequently only information defining the character itself need be stored to the exclusion of blank spaces within and surrounding the character. Thus, the storage technique shown in the first example of FIG. 3 is desirably employed in connection with a compression-decompression scheme such as of the Morrin type. As already discussed the first technique of FIG. 3 does not require the storage and positioning information along with the components since each component begins at the lefthand margin 18 of the character cell 10. By the same token data representing the relatively large amount of blank space surrounding and within the components need not be stored since in a compression-decompression technique of the Morrin type only data representing the actual printed components is stored. Consequently positioning information with respect to the components is included in the recorded components themselves and the required storage space for each character is minimal.

Figure 7:
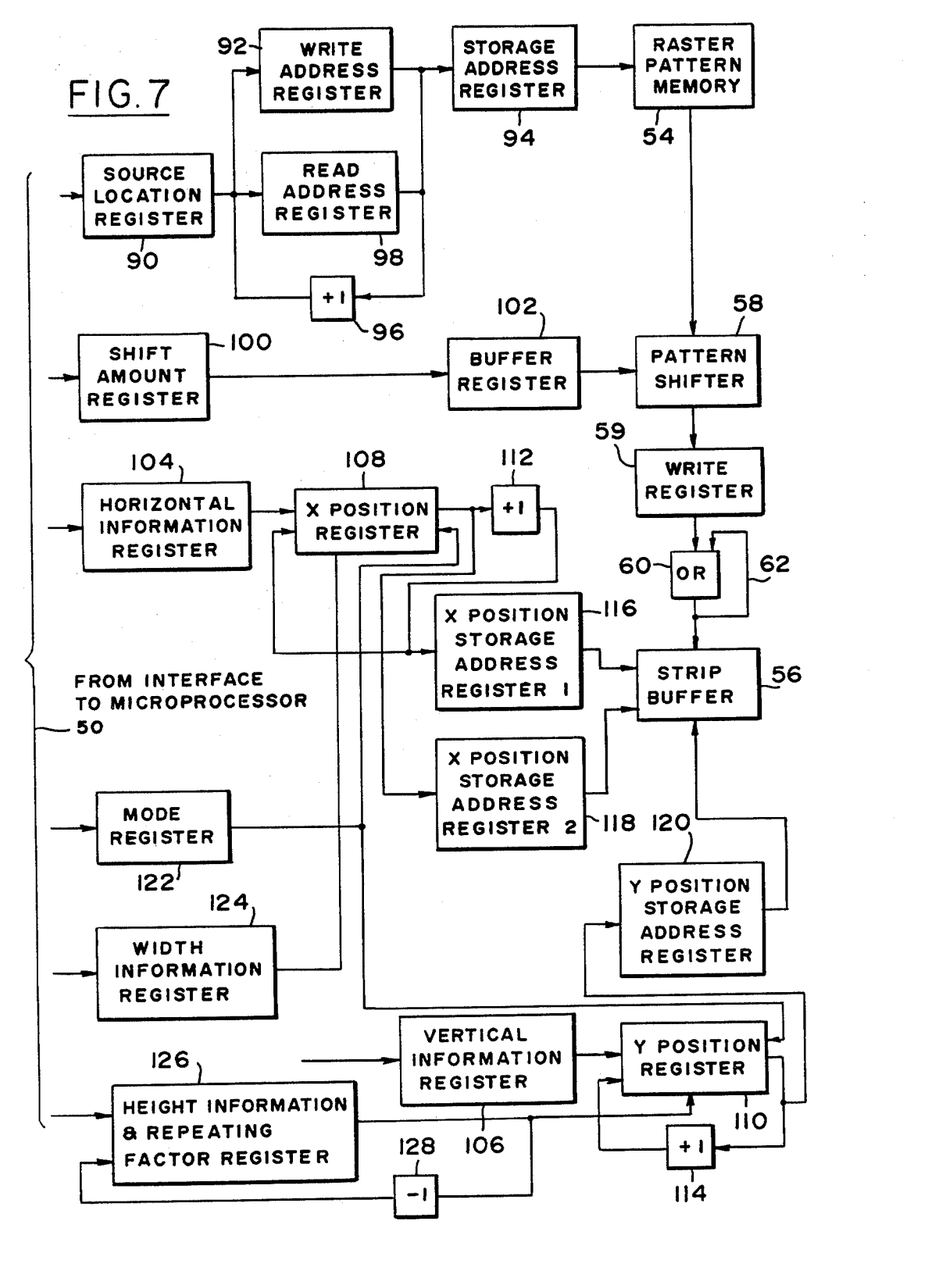
FIG. 7 is a detailed block diagram of the circuit of FIG. 6A.

The circuit of FIG. 6A is shown in considerably greater detail in FIG. 7, particularly with respect to the pattern move control 52. Initially, the addresses of the various A and B components to be stored in the raster pattern memory 54 are communicated to the memory from the microprocessor interface 50 via a source location register 90, a write address register 92 and a storage address register 94. The source location register 90 serves to store the addressing information identifying desired storage locations within the memory 54. When the components are being stored within the memory 54, each address temporarily stored in the source location register 90 is transferred and stored in the write address register 92 from which it is communicated to the storage address register 94 to select the desired location within the memory 54 for storage at the related component. The write address register 92 is incremented by a circuit 96 at the end of each 32 bit line with the address for the next line being updated in the storage address register 94. Theeafter, as various pairs of the components are selected to reconstruct characters the addressing information is temporarily stored in a read address register 98 for subsequent loading into the storage address register 94 on a line by line basis, as incremented by the circuit 96, to provide accessing of the memory 54.

The pattern shifter is controlled by a shift amount register 100 and buffer register 102. As previously noted the pattern shifter 58 has the capability of shifting each incoming 32 bit line within a 64 bit space. The microprocessor interface 50 provides to the shift amount register 100 a signal representing the amount of shift of each 32 bit line in the pattern shifter 58. Such signals are temporarily stored in the buffer register 102 and are applied to the pattern shifter 58 to provide the required amount of shift.

The output of the pattern shifter 58 is coupled via a write register 59 to the OR circuit 60. The OR circuit 60 which has the feedback loop 62 providing a second input thereto is coupled to the strip buffer 56.

The microprocessor interface 50 identifies the starting point of each character cell on a given page relative to an X, Y coordinate system and provides the X value to a horizontal information register 104 and the Y value to a vertical information register 106. Each X value is transferred to an X position register 108, and each Y value is transferred to a Y position register 110. The X value is incremented by a circuit 112 to shift back and forth between the first 32 bit positions and the second 32 bit positions in each 64 bit line from the pattern shifter 58. The output of the X position register 108 is coupled directly to an X position storage address register 2 118 and via the circuit 112 to an X position storage address register 1 116. The registers 116 and 118 alternately address the two different portions of each 64 bit line as the strip buffer 56 is loaded with each new line. The Y position register 110 is provided to a Y position storage address register 120 for proper positioning of data within the strip buffer 56. The output of the Y position register 110 is also incremented by a circuit 114 so as to identify the different 64 bit lines as they are loaded in the strip buffer 56.

A mode register 122 responds to signals from the microprocessor interface 50 to indicate employment of either a character mode or an image mode for deriving and storing the data in the strip buffer 56. In the character mode a sequence of up to 64 lines, each having a width of either 32 bits or 16 bits, is assembled in the strip buffer 56. In such instances X remains the same and Y changes with each new line. The Y information is provided to a height information and repeating factor register 126 which is incremented downward by a circuit 128. The register 126 coordinates with the Y position register 110 to identify the Y position of each 16 or 32 bit line.

When the mode register 122 indicates that the image mode is to be used, each image or image portion is comprised of a selected number of lines which are equal in length to some multiple of 32 bits. In such instances the height information and repeating factor register 126 stores information indicating how many times each group of 32 bits is to be repeated to form a line. A width information register 124 which stores information indicating the number of bits per line up to a total of 32 and which coordinates the operation of the X position register 108 stores the maximum value 32. Accordingly, the X position register 108 is incremented with each 32 bits while the Y position register 110 stores the same value until the line is finished.

The description thus far has been in terms of characters divided vertically into components of equal height accompanied by information as to their location across the width of the character cell. However, a few characters are more easily divided horizontally into components of equal width. In such cases the positioning information stored with the components identifies the positions of the components relative to the height of the character cell and the top horizontal edge of the character becomes the reference margin. In still further arrangements it may be necessary to rotate the raster pattern bits 90° to accommodate the particular requirements of the imaging apparatus used in the printer. In such instances it is possible to store positioning information with the components that will provide for rotation of the components as they are combined to reconstruct the character.

While the invention has been particularly shown and described with reference to a preferred embodiment thereof, it will be understood by those skilled in the art that various changes in form and details may be made therein without departing from the spirit and scope of the invention.

What is claimed is:

1. A machine implementable method for reconstructing Chinese-like whole characters in a designated alphabet comprising the steps of:

storing component parts of like size in a given dimension of the Chinese-like characters in the designated alphabet as a first set of data, together with representations of the locations of the component parts within a standard space occupied by each character as a second set of data, each component having a predetermined fixed size and shape within the standard space; and responding to a command to reconstruct a given character from the designated alphabet in the standard space by selecting and pairwise combining the component parts of the given character from the first set of data and locating the selected component parts within the standard space in selectively displaced or superimposed relation in accordance with representations of the location of the component parts from the second set of data.

2. A machine implementable method for reconstruction of whole ideographic characters in a designated alphabet comprising the steps of:

storing a graphical representation of each of a plurality of components of the characters, together with information as to the identities and relative locations of the components comprising each of the characters, each of the components having a predetermined fixed size and shape within a standard space occupied by each character; and thereafter responding to a command to reconstruct a given one of the characters by:
- identifying the components comprising the character and information as to the relative location of the components within the standard space; and
- forming the pairwise graphical representations of the identified components in the standard space in selectively displaced or superimposed relation in accordance with the information as to the relative location of the components to form a graphical representation of the character.

3. A machine implementable method for the reconstruction of whole ideographic characters comprising the steps of:
encoding and storing each whole ideographic character C in a designated alphabet as the code equivalent of selected members of a first stored set R of dot matrix graphical components and selected members of a second stored set D of displacement, rotation, and width information, set R consisting of unique subcharacters of predetermined fixed size and shape within a standard space for each character, further, set R subcharacters being selected from those whole characters partitionable into two subcharacters at least one of which is common to a plurality of the whole characters; and forming selected ones of the whole ideographic characters C upon command by logically combining members of the sets R and D such that:

$$C = R_1 D_1 + R_2 D_2$$

where "+" is a general Boolean logical operator, $R_1$ and $R_2$ are selected from the set R and $D_1$ and $D_2$ are selected from the set D, selected ones of the components abutting and some superimposing when combined.

4. A machine implementable method for the reconstruction of whole ideographic characters from selected ones of a prestored set of graphical strokes and orientation data, the method steps comprise:
responsive to a command defining an ordered sequence of elements of stroke and orientation data:
- forming selected whole characters by the combining of graphical strokes pairwise and selectively spacing or superimposing strokes within a fixed frame; and
- applying said formed whole characters to a display device such as a printer or the like.

* * * * *